US00RE37013E

(19) United States
(12) Reissued Patent
Wittek, Sr. et al.

(10) Patent Number: US RE37,013 E
(45) Date of Reissued Patent: Jan. 9, 2001

(54) TEE DIVIDER FOR GOLF DRIVING RANGE

(75) Inventors: Robert Wittek, Sr., Park Ridge; Aron Cantrell, River Grove; Terry Sopko, Wood Dale, all of IL (US)

(73) Assignee: Wittek Golf Supply Co., Inc., Chicago, IL (US)

(21) Appl. No.: 09/026,315

(22) Filed: Feb. 19, 1998

Related U.S. Patent Documents

Reissue of:
(64) Patent No.: 5,586,942
Issued: Dec. 24, 1996
Appl. No.: 08/590,166
Filed: Jan. 23, 1996

(51) Int. Cl.[7] ..... A63B 5/00
(52) U.S. Cl. ..... 473/168; 211/70.2; 160/352; 473/405
(58) Field of Search ..... 473/168–171, 473/100, 405; 248/96; 211/70.2, 71; 160/351, 352

(56) References Cited

U.S. PATENT DOCUMENTS 1,852,948 4/1932 Warren et al. .
3,897,947 8/1975 Heffley, Jr. .
4,014,521 3/1977 Berman .
4,045,103 8/1977 Paolino .
4,063,738 12/1977 Michalson .
4,085,789 4/1978 Steiner et al. .
4,134,439 1/1979 Scott .
4,842,035 6/1989 Thompson .
4,948,141 8/1990 Newman .
5,014,985 5/1991 Capps .
5,029,855 7/1991 Jamieson et al. .
5,092,600 3/1992 Ruth, Jr. et al. .
5,482,269 1/1996 Scott et al. .
5,547,186 * 8/1996 Papp et al. ..... 473/168
5,603,669 2/1997 Scott et al. .

* cited by examiner

*Primary Examiner*—Mark S. Graham
(74) *Attorney, Agent, or Firm*—Marshall, O'Toole, Gerstein, Murray & Borun

(57) ABSTRACT

A tee divider for a golf ball driving range is provided of unitary construction having an upstanding wall and a console-like formation at one end thereof provided with outwardly opening storage pockets for articles, said pockets having drains for eliminating liquid accumulating in said pockets and grooves in a surface of said formation for holding a golf club in a vertical position. The divider has laterally protruding flanges for anchoring it at the site of the tee provided on the golf driving range.

20 Claims, 4 Drawing Sheets

TEE DIVIDER FOR GOLF DRIVING RANGE

Matter enclosed in heavy brackets [ ] appears in the original patent but forms no part of this reissue specification; matter printed in italics indicates the additions made by reissue.

FIELD OF THE INVENTION

This invention relates generally to golf ball driving ranges and more particularly, relates to a novel tee divider adapted to be installed to separate adjacent tee sites located on the player stance areas of the range.

BACKGROUND THE INVENTION

The sport of golf has become more universally popular in recent years with the advent of the televising of professional and amateur tournaments. This popularity has generated increased development of so-called local daily-fee golf courses throughout the United States and in some foreign countries. Also, the number of golf ball driving ranges has proliferated.

The conventional golf driving range provides a quantity of tee sites for use by players from which to drive the golf balls to far reaching areas of the range. Such tee sites are locations usually delineated by individual grass areas, mats or platforms arranged in sequence along the area assigned from which the player drives the golf balls. These golf driving ranges enable a golfer to practice his golf strokes in early spring before embarking on his more or less regular play on a golf course during the golf season.

The divider embodying the invention is adapted to be installed between adjacent tee sites of a golf ball driving range as a divider to separate adjacent tee sites and the two players on the respective tee sites when they are driving golf balls. Further, this tee divider has an upper enlarged flat surface in which is provided a recessed pocket for holding a pail or bucket of golf balls and one or more recessed pockets for holding a beverage can, glass or cup. Liquid drainage means for said pockets are provided. The rear end of the divider has at least one elongated slot or groove into which the shaft of a golf club can be inserted for holding the club in an upright position supported on the head of the club.

The tee divider embodying the invention preferably is a unitary molded or cast member formed from a suitably strong synthetic plastic material or a combination of materials suitable for providing the desired structural strength, stability and ability to withstand exposure to the natural elements, such as rain or snow.

SUMMARY OF THE INVENTION

The subject invention comprises a tee divider of unitary construction having an upstanding divider wall widened at its base with laterally extending flanges for anchoring the divider to the ground between adjacent tee site areas, said wall having suitably dimensioned recessed pockets opening upwardly for holding articles such as a bucket of golf balls, beverage cans or other beverage containers, said pockets having drainage means for automatically draining liquid entering into the pockets, and means for holding one or more golf clubs in an upright position for ready access to the golfer.

DETAILED DESCRIPTION OF PREFERRED EMBODIMENT

Figure 1:
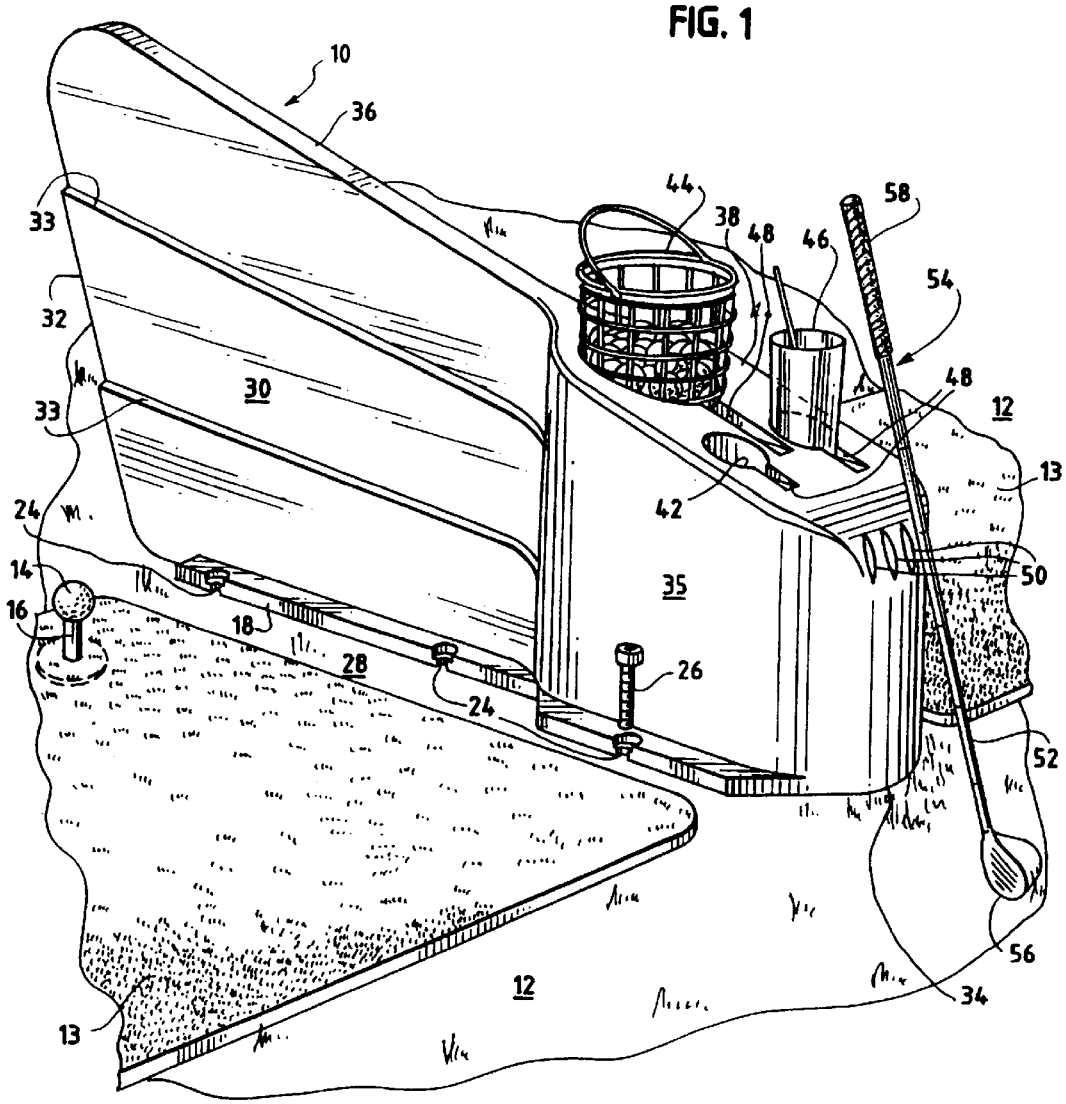
FIG. 1 is a perspective view of the tee divider embodying the invention and shown installed between two adjacent tee sites of the range. Further shown is a bucket for holding golf balls received in a recessed pocket and a beverage container received in a recessed pocket and an upright golf club with its shaft received in an elongated slot or groove provided in the tee divider for temporary storage of these items.
Figure 2:
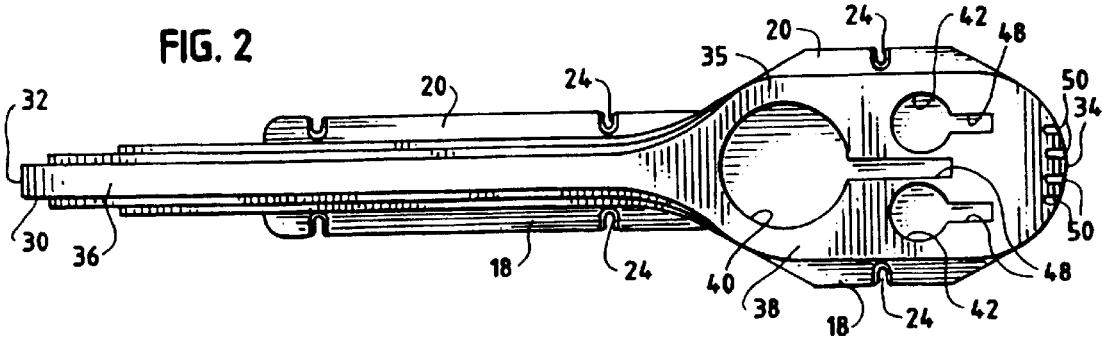
FIG. 2 is a top plan view of the tee divider embodying the invention without the bucket, beverage container or golf club being shown.

Referring to FIG. 1, the tee divider embodying the invention is designated generally by the reference character 10. The tee divider 10 is shown in position to be installed between the adjacent player designated 12. Such a stance area can consist of a mat or platform 13 of suitable material for the player to take his stance preparatory to driving the golf ball 14 in place on the tee 16.

The tee divider 10 is a unitary molded or cast member having protruding elongated lateral flanges 18 and 20 along opposite sides of the base 22. The flanges 18 and 20 are each provided with a plurality of openings or cutouts 24 therethrough into each of which can be inserted a fastener 26 for removably anchoring the tee divider 10 to the ground 28 between the stance areas 12. The thusly anchored laterally protruding flanges 18 and 20 serve to provide desired stability against the divider 10 being tipped over inadvertently during play on either side of the tee divider.

Upstanding from the base 22 is a wall 30 which extends continuously from the front end 32 toward the rear end 34. In each face of the wall 30 are provided strengthening ribs 33. The flat upper surface 36 of wall 30 is pitched to extend rearwardly from front end 32 at an approximate 15° angle pitch for approximately two-thirds (⅔) of the length of the divider where said surface 36 is expanded to provide a flat, enlarged surface area 38 which extends to the rear end 34. The divider 10 also is enlarged at its rear end 34 to provide a console-like formation 35 to enable the pockets to be provided.

Figure 3:
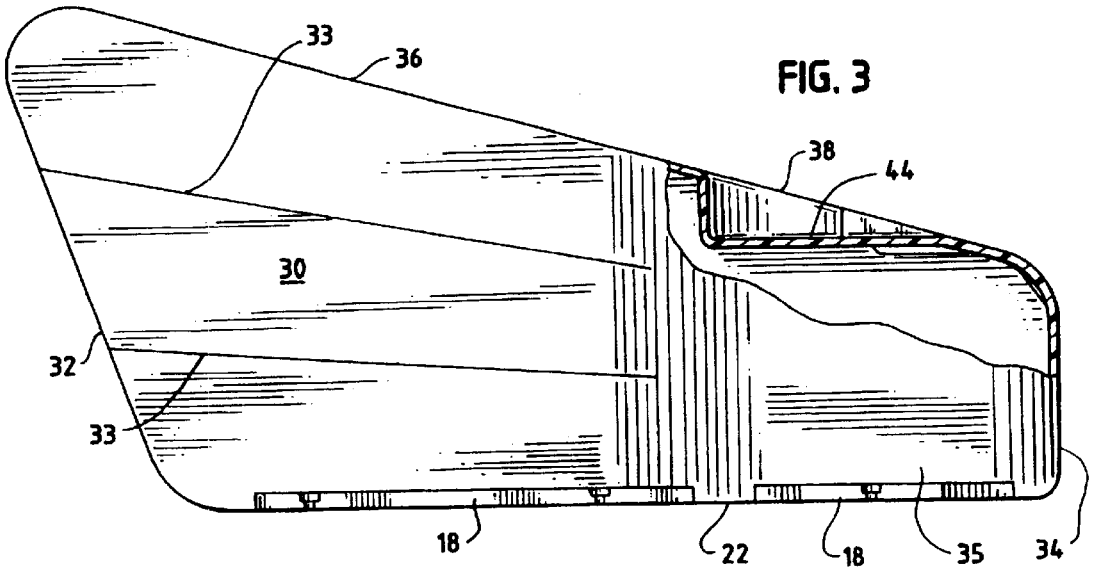
FIG. 3 is a side elevational view of the divider with a portion of the upper front end broken away to show details of the several means provided for holding the articles shown in FIG. 1.
Figure 4:
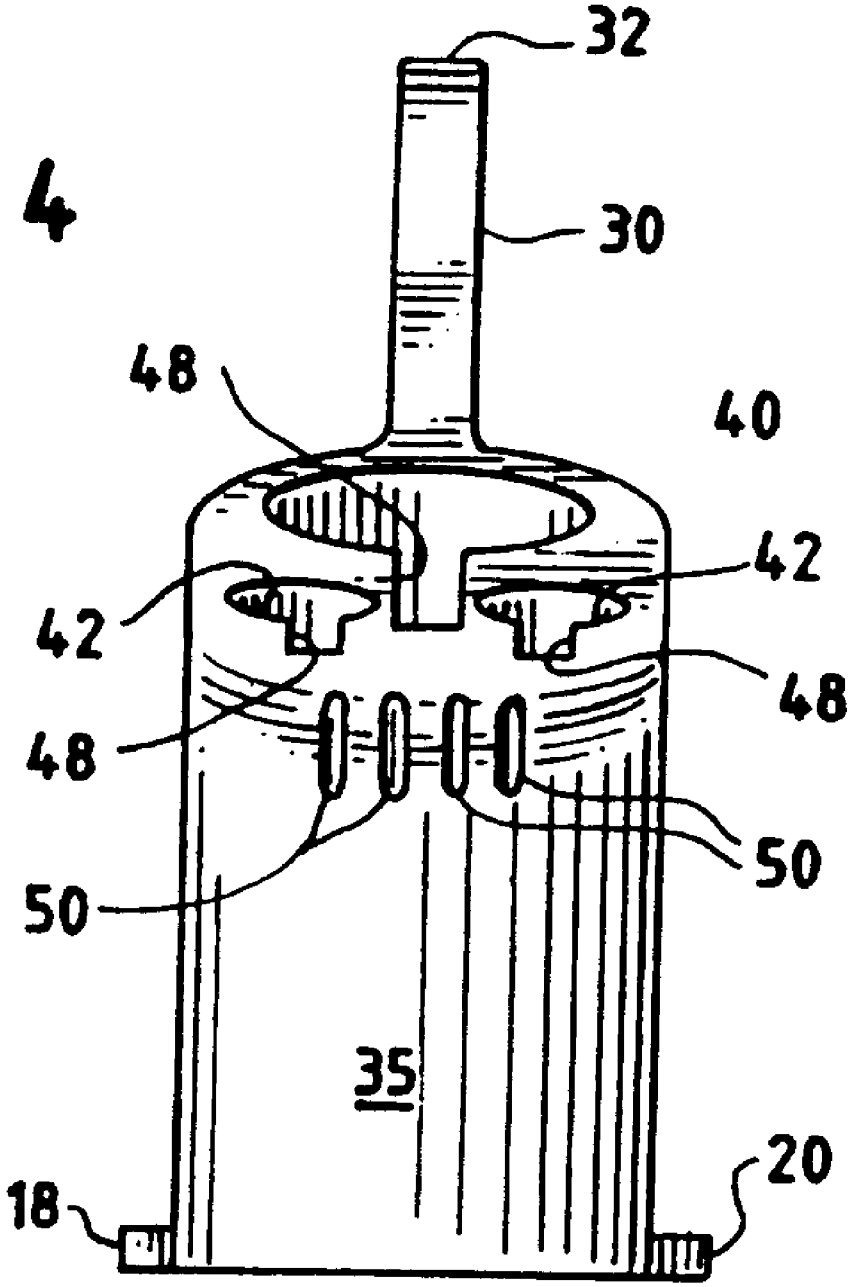
FIG. 4 is a rear end-on elevational view of the divider embodying the invention.

A cylindrical pocket or recess 40 is formed in said surface area 38. Also formed in said area 38 is a pair of smaller diameter cylindrical pockets or recesses 42. The pockets 40 and 42 each open to said surface area 38 and are closed at their bottom ends by the floor wall 44 formed in the interior of the divider 10, as seen in FIG. 3. The pockets are cylindrical in configuration and individually sized to accept a golf ball bucket 44 in pocket 40 and beverage containers, such as 46 in pockets 42. The container 46 can be a soda can or coffee cup, as examples. Of course, the pockets can function as storage pockets for other articles.

Each of the pockets 40 and 42 has a slot 48 connecting to the pocket and suitably pitched toward rear end 34 for liquid drainage purposes.

In the rounded rear end 34 is provided a series of elongated grooves 50 dimensioned to accept the shaft 52 of a club 54 standing upright on the head 56 of the club with the grip end 58 readily accessible to the golfer.

It will be appreciated that the dimensions and placement of the pockets 40 and 42 in surface 38 as well as the drainage means 48 may be varied without departing from the intended function of these pockets and drainage means within the purview of the invention as claimed. Likewise, this would be true in modifying the dimensions and configuration of the wall 30 within the purview of the invention.

We claim:

1. A tee divider for a golf ball driving range comprising, a vertically arranged imperforate wall having a canted upper surface, said wall having laterally extending flange means at the base thereof for anchoring the tee divider at the tee sites, a console-like formation connected to an end of said wall and extending forwardly from and aligned with said wall, said formation having a planer surface at the upper end thereof and upwardly opening storage means in said planar surface for holding articles therein, and liquid drainage means connected with said storage means.

2. A tee divider as claimed in claim 1 in which said storage means includes a cylindrical pocket suitably dimensioned for holding a bucket or pail of golf balls.

3. A tee divider as claimed in claim 2 which includes at least one cylindrical pocket for holding a beverage container.

4. A tee divider as claimed in claim 1 having groove means in said console formation for maintaining a golf club shaft vertically supported on the head of the club.

5. A tee divider as claimed in claim 1 which comprises a unitary structure.

6. A tee divider as claimed in claim 2 in which said means at the base of the wall comprises laterally extending flanges adapted to receive fasteners therethrough.

7. A tee divider as claimed in claim 1 in which said drainage means comprise canted runway slots for eliminating liquid accumulating in said storage means.

8. A tee divider for a golf ball driving range comprising, a unitary structure including an upstanding fin-like wall having laterally extending flanges at the base thereof, and a console formation extending from said wall, said formation having a flat, canted upper surface extending to the extremity thereof, upwardly opening pockets in said upper surface for storage of articles therein, groove means in said extremity constructed and arranged to receive the shaft of a golf club therein.

9. A tee divider as claimed in claim 8 which includes liquid drainage runways connected to the pockets.

10. A tee divider as claimed in claim 9 in which one of said pockets is cylindrical in configuration for storing a bucket or pail of golf balls.

11. A tee divider as claimed in claim 8 in which said groove means are vertically oriented for engaging the shaft whereby to support the club vertically against the console.

*12. A tee divider for a golf ball driving range comprising, a unitary structure including a vertically arranged, continuously extending, imperforate fin-like wall, said wall having an upper surface pitched at an angle of approximately 15° to extend rearwardly and downwardly from a front end toward a rear end of said wall for at least a major portion of the length of the tee divider, a console-like formation integrally formed in a portion of the wall, and means associated with said unitary structure for anchoring the tee divider at a tee site.*

*13. A tee divider as claimed in claim 12 in which said wall has a pair of faces and each of said faces has at least one strengthening rib formed therein.*

*14. A tee divider as claimed in claim 12 in which said major portion of the length of the tee divider is approximately two-thirds of the length of the tee divider.*

*15. A tee divider as claimed in claim 12, wherein the console-like formation is formed in said rear end of said wall and extending from and aligned with said wall.*

*16. A tee divider as claimed in claim 15 in which said console-like formation has a flat upper surface enlarged in relation to said upper surface of said wall.*

*17. A tee divider as claimed in claim 16 including at least one upwardly opening pocket in said flat upper surface of said console-like formation for holding an article therein.*

*18. A tee divider for a golf ball driving range comprising, a unitary structure including a vertically arranged imperforate fin-like wall having a canted upper surface, a console-like formation integral with one end of said wall and extending from and aligned with said wall, said formation having an upper surface enlarged in relation to said upper surface of said wall, said formation upper surface defining an upwardly facing storage area, and laterally extending flange means associated with said unitary structure for anchoring the tee divider at a tee site.*

*19. A tee divider for a golf ball driving range comprising, a unitary structure including a base defined by laterally extending flanges, a vertically disposed, continuously extending, fin-like wall upstanding from said base and having a canted upper surface, and an enlargement at one end of said wall defining a console-like formation extending from and aligned with said wall, said console-like formation having an upwardly opening pocket formed therein adapted to receive articles.*

*20. A tee divider for a golf ball driving range, comprising:*

*a unitary structure including a vertically arranged, imperforate fin-like wall having a front end and a rear end, the wall including an upper surface canted downwardly from the front end toward the rear end;*

*a base formed in the wall and having a laterally extending flange; and*

*a forwardly extending console formed in the rear end, the console including an upper surface generally circumscribing a storage area formed in the console.*

* * * * *